United States Patent
Goffe

(10) Patent No.: US 10,058,819 B2
(45) Date of Patent: Aug. 28, 2018

(54) THERMALLY INTEGRATED COMPACT AFTERTREATMENT SYSTEM

(71) Applicant: Randal A. Goffe, Everett, WA (US)

(72) Inventor: Randal A. Goffe, Everett, WA (US)

(73) Assignee: PACCAR Inc, Bellevue, WA (US)

( * ) Notice: Subject to any disclaimer, the term of this patent is extended or adjusted under 35 U.S.C. 154(b) by 307 days.

(21) Appl. No.: 14/935,125

(22) Filed: Nov. 6, 2015

(65) Prior Publication Data

US 2017/0128885 A1 May 11, 2017

(51) Int. Cl.
    *B01D 53/56* (2006.01)
    *B01D 53/94* (2006.01)

(52) U.S. Cl.
    CPC ..... *B01D 53/9477* (2013.01); *B01D 53/9495* (2013.01); *B01D 2255/904* (2013.01)

(58) Field of Classification Search
None
See application file for complete search history.

(56) References Cited

U.S. PATENT DOCUMENTS

| | | |
|---|---|---|
| 858,904 A | 7/1907 | Ostwald |
| 3,730,691 A | 5/1973 | Lang et al. |
| 4,711,871 A | 12/1987 | Wachs et al. |
| 4,929,581 A | 5/1990 | Steinwandel et al. |
| 5,149,512 A | 9/1992 | Li et al. |
| 6,475,944 B1 | 11/2002 | Yang et al. |
| 6,826,906 B2 | 12/2004 | Kakwani et al. |
| 7,078,004 B2 | 7/2006 | Voss et al. |
| 7,229,597 B2 | 6/2007 | Patchett et al. |

(Continued)

FOREIGN PATENT DOCUMENTS

| | | |
|---|---|---|
| CN | 103866343 B | 6/2014 |
| CN | 105363497 A | 3/2016 |

(Continued)

OTHER PUBLICATIONS

International Search Report and Written Opinion dated Mar. 30, 2017, issued in corresponding PCT/US2016/060583, filed Nov. 4, 2016, 7 pages.

(Continued)

*Primary Examiner* — Anita Nassiri Motlagh
(74) *Attorney, Agent, or Firm* — Christensen O'Connor Johnson Kindness PLLC

(57) ABSTRACT

A thermally integrated catalyst aftertreatment exhaust system includes a flow channel that directs diesel exhaust through a diesel oxidation catalyst unit that includes a diesel oxidation catalyst, by a doser that introduces DEF into the diesel exhaust, through a mixing chamber that includes a static metallic mixer coated with a DEF hydrolysis catalyst, and through an SCR unit that includes an SCR catalyst. The diesel oxidation catalyst converts a portion of diesel exhaust into water, carbon dioxide, or nitrogen dioxide. The DEF hydrolysis catalyst facilitates hydrolysis of the mixed DEF and diesel exhaust. The SCR catalyst facilitates reduction of NOx in the diesel exhaust. A first portion of the flow channel is in direct thermal contact with a second portion of the flow channel that houses the SCR unit such that heat from the diesel exhaust before the diesel exhaust reaches the doser is passed to the SCR unit.

21 Claims, 10 Drawing Sheets

(56) References Cited

U.S. PATENT DOCUMENTS

| | | | |
|---|---|---|---|
| 7,902,107 B2 | 3/2011 | Patchett et al. | |
| 7,998,423 B2 | 8/2011 | Boorse et al. | |
| 8,017,543 B2 | 9/2011 | Andy et al. | |
| 8,119,088 B2 | 2/2012 | Boorse et al. | |
| 8,501,132 B2 | 8/2013 | Fu et al. | |
| 8,568,675 B2 | 10/2013 | Deeba et al. | |
| 8,667,785 B2 | 3/2014 | Blakeman et al. | |
| 8,679,434 B1 | 3/2014 | Li et al. | |
| 8,828,900 B2 | 9/2014 | Takagi et al. | |
| 8,989,637 B2 | 3/2015 | Yoshii | |
| 9,005,559 B2 | 4/2015 | Sumiya et al. | |
| 9,034,269 B2 | 5/2015 | Hilgendorff et al. | |
| 9,737,877 B2 | 8/2017 | Goffe | |
| 9,757,691 B2 | 9/2017 | Goffe | |
| 9,764,287 B2 | 9/2017 | Goffe | |
| 2006/0049063 A1 | 3/2006 | Murphy et al. | |
| 2006/0057046 A1 | 3/2006 | Punke et al. | |
| 2008/0314027 A1* | 12/2008 | Barber | B01D 53/90 60/286 |
| 2010/0146950 A1* | 6/2010 | Hayashi | B01D 53/9431 60/301 |
| 2010/0172828 A1 | 7/2010 | Althoff et al. | |
| 2010/0180580 A1* | 7/2010 | Boorse | F01N 3/035 60/297 |
| 2011/0142737 A1 | 6/2011 | Seyler et al. | |
| 2011/0250114 A1 | 10/2011 | Augustine et al. | |
| 2011/0302909 A1 | 12/2011 | Botte | |
| 2012/0058034 A1 | 3/2012 | Ogunwumi et al. | |
| 2012/0121486 A1 | 5/2012 | Collier et al. | |
| 2012/0175247 A1 | 7/2012 | Darrel | |
| 2012/0230881 A1 | 9/2012 | Boger et al. | |
| 2013/0102819 A1 | 4/2013 | Szesni et al. | |
| 2013/0121902 A1 | 5/2013 | Adelmann et al. | |
| 2014/0041366 A1 | 2/2014 | Seyler et al. | |
| 2014/0044627 A1 | 2/2014 | Siani et al. | |
| 2014/0140909 A1 | 5/2014 | Qi et al. | |
| 2014/0193746 A1 | 7/2014 | Cerri et al. | |
| 2014/0227155 A1 | 8/2014 | Phillips et al. | |
| 2015/0017075 A1 | 1/2015 | Jinbo et al. | |
| 2015/0017083 A1* | 1/2015 | Maunula | B01D 53/9468 423/239.1 |
| 2015/0209766 A1 | 7/2015 | Xavier et al. | |
| 2015/0360212 A1 | 12/2015 | Chandler et al. | |
| 2016/0040576 A1 | 2/2016 | Chandler et al. | |
| 2016/0045868 A1 | 2/2016 | Sonntag et al. | |
| 2016/0074809 A1 | 3/2016 | Goffe | |
| 2016/0074839 A1 | 3/2016 | Goffe | |
| 2016/0136617 A1 | 5/2016 | Nazarpoor et al. | |
| 2016/0214086 A1 | 7/2016 | Ano et al. | |
| 2016/0339389 A1 | 11/2016 | Hoke et al. | |
| 2016/0346765 A1 | 12/2016 | Nazarpoor et al. | |
| 2017/0128881 A1 | 5/2017 | Goffe | |
| 2017/0128884 A1 | 5/2017 | Goffe | |

FOREIGN PATENT DOCUMENTS

| | | |
|---|---|---|
| EP | 1945356 A1 | 7/2008 |
| GB | 2504024 B | 3/2014 |
| WO | 2008/094889 A1 | 8/2008 |
| WO | 2012/059144 A1 | 5/2012 |
| WO | 2014027207 A1 | 2/2014 |

OTHER PUBLICATIONS

Office Action dated Dec. 1, 2016, from related U.S. Appl. No. 14/934,955, filed Nov. 6, 2015, 20 pages.

Office Action dated Dec. 16, 2016, from related U.S. Appl. No. 14/935,001, filed Nov. 6, 2015, 7 pages.

Office Action dated Jan. 19, 2017, from related U.S. Appl. No. 14/935,199, filed Nov. 6, 2015, 19 pages.

Office Action dated Jan. 23, 2017, from related U.S. Appl. No. 14/935,048, filed Nov. 6, 2015, 9 pages.

Conway, R., et al., "Demonstration of SCR on a Diesel Particulate Filter System on a Heavy Duty Application," SAE Technical Paper 2015-01-1033, Apr. 14, 2015, Abstract.

Devarakonda, M.N., et al., "Technical Challenges in the Integration of DPF and SCR Aftertreatment—Review From a Systems and Modeling Perspective," 12th DOE Cross-Cut Workshop on Lean Exhaust Emissions Reduction Simulations [CLEERS], Apr. 28-30, 2009, Dearborn, Mich., Abstract, 1 page.

Devarakonda, M.N., et al., "Technical Challenges in the Integration of DPF and SCR Aftertreatment on a Single Substrate—Review From a Systems and Modeling Perspective," presented by Maruthi N. Devarakonda at 12th DOE Cross-Cut Workshop on Lean Exhaust Emissions Reduction Simulations [CLEERS], Apr. 28-30, 2009, Dearborn, Mich., Apr. 29, 2009, 22 pages.

"Engine Aftertreatment Systems: Operator's Manual," No. Y53-1090C, PACCAR Inc, Bellevue, Wash., 2011, 42 pages.

Geisselmann, A., "Future Aftertreatment Concepts for Heavy Duty Application," Abstract in SAE 2014 Heavy Duty Diesel Emissions Control Symposium, Event Guide, Gothenburg, Sweden, Sep. 17-18, 2014, p. 25.

Goffe, R.A., and D.M. Mason, "Electrocatalytic Oxidation of Hydrocarbons on a Stabilized-Zirconia Electrolyte Employing Gold or Platinum Electrodes," Journal of Applied Electrochemistry 11(4):447-452, Jul. 1981.

Kwak, J.H., et al., "Effects of Hydrothermal Aging on $NH_3$-SCR Reaction Over Cu/Zeolites," Journal of Catalysis 287(1):203-209, Mar. 2012.

Kwak, J.H., et al., "Excellent Activity and Selectivity of Cu-SSZ-13 in the Selective Catalytic Reduction of NO(x) and $NH_3$," Journal of Catalysis 275(2):187-190, Oct. 2010.

Rappé, K.G., "Combination and Integration of DPF-SCR Aftertreatment Technologies," presented by Kenneth G. Rappé at Annual Merit Review and Peer Evaluation, May 16, 2012, 24 pages.

Rappé, K.G., and G.D. Maupin, "III.6 Integration of DPF & SCR Technologies for Combined Soot and NO(x) After-Treatment," Advanced Combustion Engine R&D, FY 2014 Annual Report, Pacific Northwest National Laboratory, Richland, Wash., pp. III-30-III-33.

Rappé, K.G., et al., "Combination & Integration of DPF-SCR Aftertreatment," presented by Kenneth G. Rappé at Directions in Engine-Efficiency and Emissions Research Conference [DEER 2011], Detroit, Mich., Oct. 5, 2011, 18 pages.

Rappé, K.G., et al., "Combination & Integration of DPF-SCR Aftertreatment," presented by Kenneth G. Rappé at Directions in Engine-Efficiency and Emissions Research Conference [DEER 2012], Dearborn, Mich., Oct. 18, 2012, 34 pages.

Rappé, K.G., et al., "Combination and Integration of DPF-SCR Aftertreatment Technologies," presented by Darrell R. Herling at the DOE Annual Merit Review and Peer Evaluation, Arlington, Va., May 11, 2011, 24 pages.

Rappé, K.G., et al., "Combination and Integration of DPF-SCR Aftertreatment Technologies," presented by Darrell R. Herling at the DOE Annual Merit Review and Peer Evaluation, Washington, D.C., Jun. 9, 2010, 16 pages.

Rappé, K.G., et al., "II.B.12 Combination and Integration of DPF-SCR After-Treatment," Advanced Combustion Engine R&D, FY 2011 Annual Report, Pacific Northwest National Laboratory, Richland, Wash., pp. 227-230.

Storey, J.M.E., et al., "Characterization of Urea Decomposition Products in Selective Catalytic Reduction Catalyst Systems," Abstracts of Papers of the American Chemical Society, Washington, D.C., 2011, vol. 242, 2 pages.

Ye, Q., et al., "Activity, Propene Poisoning Resistance and Hydrothermal Stability of Copper Exchanged Chabazite-Like Zeolite Catalysts for SCR of NO With Ammonia in Comparison to Cu/ZSM-5," Applied Catalysis A: General 427-428:24-34, Jun. 2012.

Koebel, M., and E.O. Strutz, "Thermal and Hydrolytic Decomposition of Urea for Automotive Selective Catalytic Reduction Systems: Thermochemical and Practical Aspects," Industrial and Engineering Chemistry Research 42(10):2093-2100, May 2003.

Köster, K., et al., "Regeneration of Hemofiltrate by Anodic Oxidation of Urea," Artificial Organs 7(2):163-168, May 1983.

(56) References Cited

OTHER PUBLICATIONS

Patzer II, J.F., et al., "Urea Oxidation Kinetics via Cyclic Voltammetry: Application to Regenerative Hemodialysis," Bioelectrochemistry and Bioenergetics 276(3):341-353, Dec. 1989.

Patzer II, J.F., et al., "Voltage Polarity Relay—Optimal Control of Electrochemical Urea Oxidation," IEEE Transactions on Biomedical Engineering 38(11):1157-1162, Nov. 1991.

Yao, S.J., et al., "Anodic Oxidation of Urea and an Electrochemical Approach to De-ureation," Nature 241(5390):471-472, Feb. 1973.

\* cited by examiner

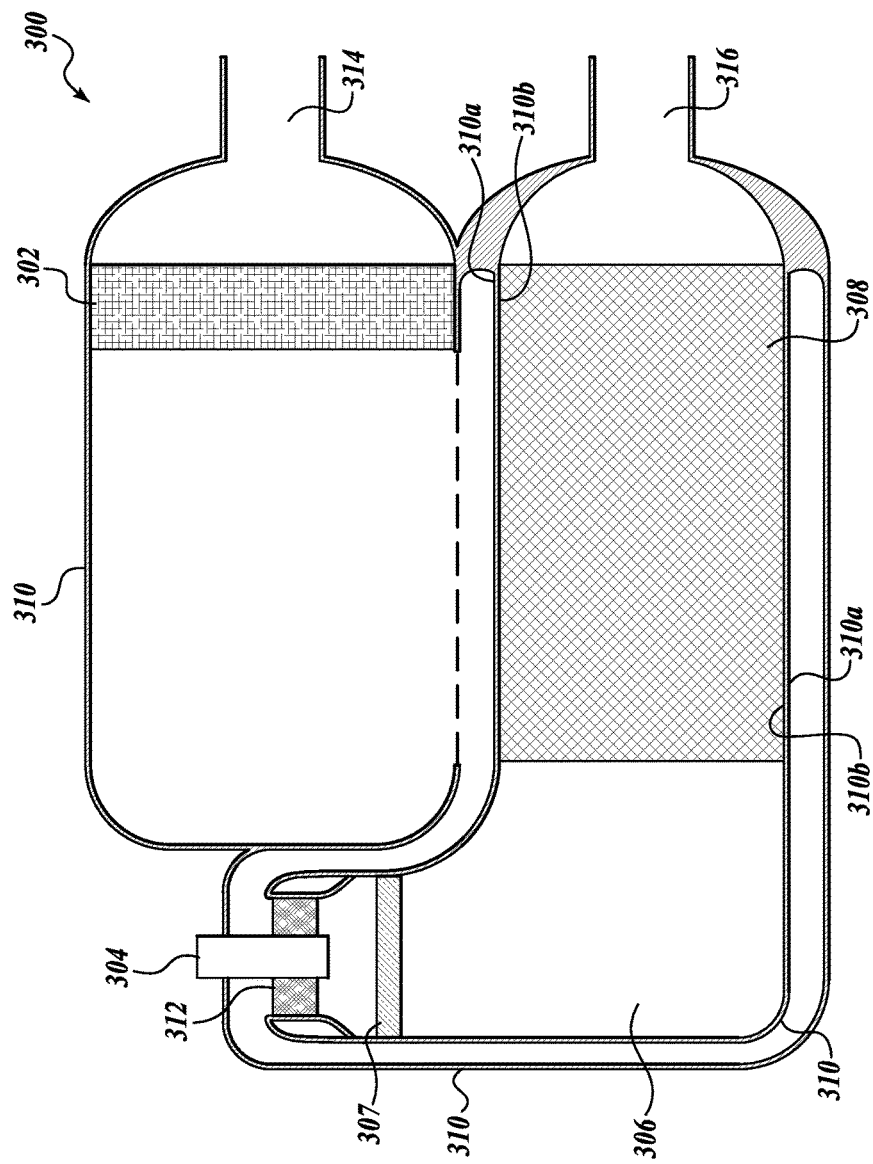

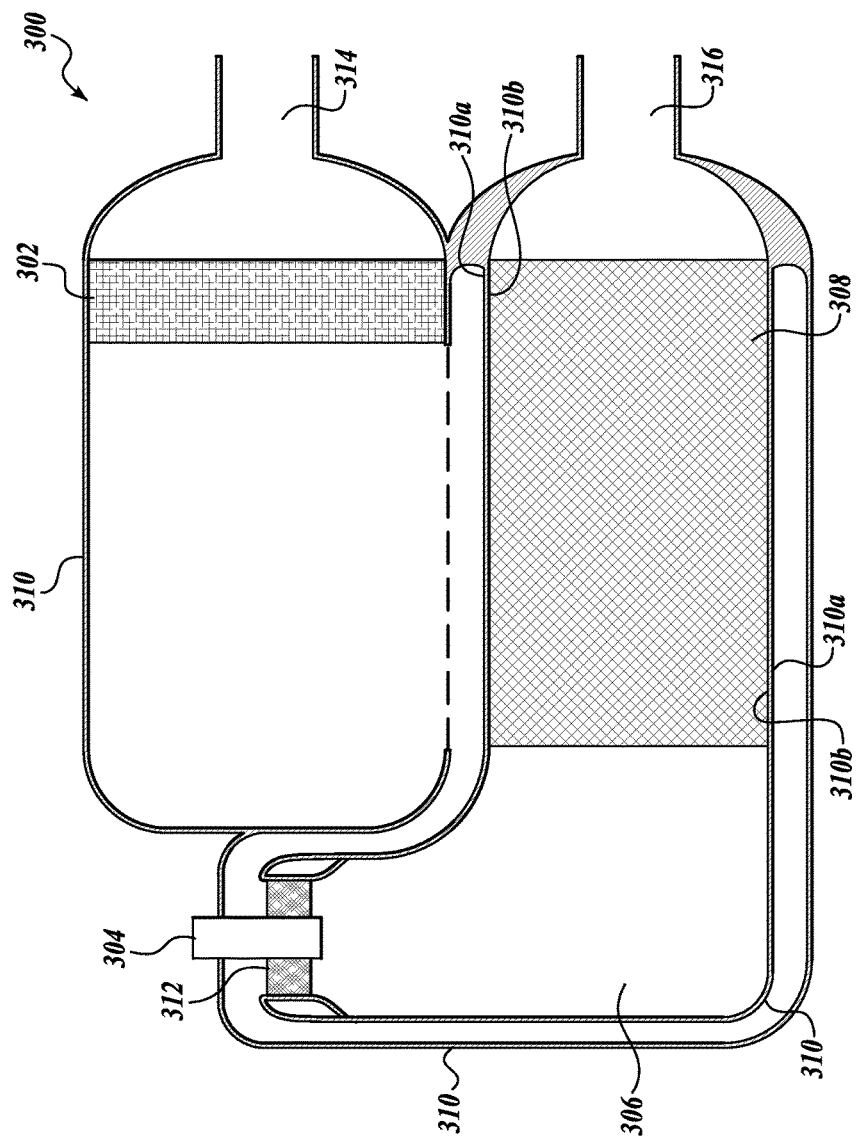

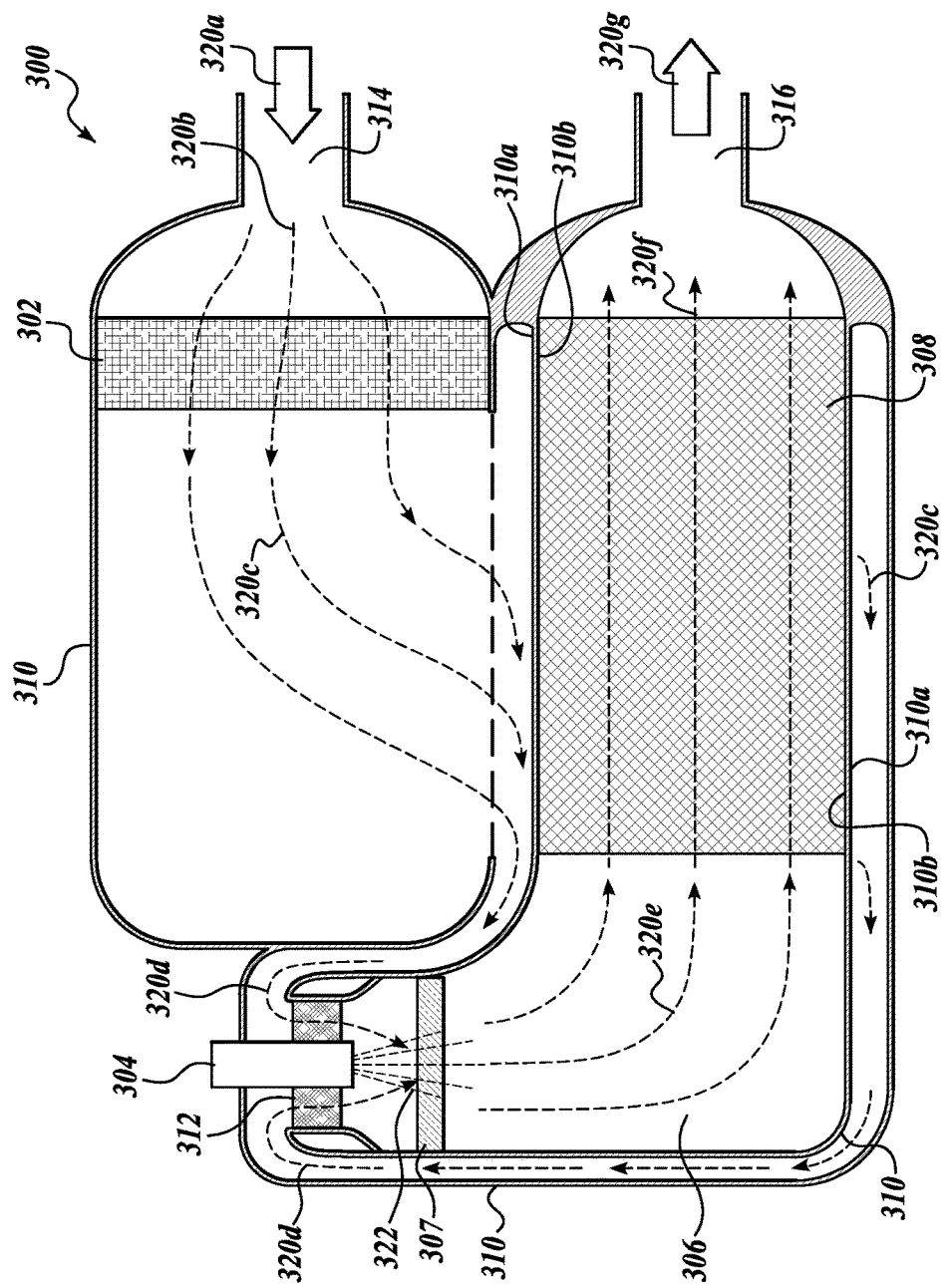

THERMALLY INTEGRATED COMPACT AFTERTREATMENT SYSTEM

CROSS-REFERENCES TO RELATED APPLICATIONS

The present application is related to U.S. patent application Ser. No. 14/935,048, filed Nov. 6, 2015; to U.S. patent application Ser. No. 14/935,199, filed Nov. 6, 2015; to U.S. patent application Ser. No. 14/934,955, filed Nov. 6, 2015; to U.S. patent application Ser. No. 14/935,094, filed Nov. 6, 2015; and to U.S. patent application Ser. No. 14/935,001, filed Nov. 6, 2015, each expressly incorporated herein by reference it its entirety.

BACKGROUND

Regulatory air pollution limits for diesel engines have caused some manufacturers to adopt engine aftertreatment systems (EASs) for treating diesel exhaust before it is released into the atmosphere. Various EAS functions include conversion of pollutant compounds in diesel exhaust into non-pollutant compounds and filtering of pollutant compounds from diesel exhaust.

Some EASs include selective catalytic reduction (SCR) technology for reducing nitrogen oxides (NOx) in diesel exhaust. The SCR process introduces a diesel exhaust fluid (DEF), such as an NOx reducing compound (e.g., a urea water solution), into the hot exhaust gas. The DEF chemically reduces pollutant compounds, such as NOx, into non-pollutant compounds in conjunction with a catalyst. Other EASs include diesel particulate filter (DPF) technology. The DPF filters soot from diesel exhaust, thereby reducing the amount of soot expelled from the vehicle. In some cases, the DPF also passively oxidizes diesel exhaust.

Some EASs have a combined SCR unit and DPF unit, sometimes referred to as an "SCRF." The use of an SCRF in place of separate SCR and DPF units decreases cost while reducing size of the EAS. However, many EASs that include an SCRF unit also require an additional SCR unit or two to obtain the desired aftertreatment effect. The result of adding one or more additional SCR units is increased cost and overall size, as well as other disadvantages, such as increased pressure differential through the EAS and reduced fuel economy. A higher pressure differential through the EAS causes frequent active regenerations by control systems, which is undesirable for the stability of a catalyst in an SCR and can result in rapid hydrothermal catalytic aging.

With the combined efforts to decrease EAS size and increase EAS efficiency, an EAS is needed that permits the use of an SCRF without requiring the use of an additional SCR unit.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a thermally integrated catalyst aftertreatment (TICA) exhaust system includes a diesel oxidation catalyst unit, a doser, a mixing chamber, a selective catalytic reduction (SCR) unit, and a flow channel. The diesel oxidation catalyst unit includes a diesel oxidation catalyst configured to convert a portion of diesel exhaust into one or more of water, carbon dioxide, or nitrogen dioxide. The doser is configured to introduce diesel exhaust fluid (DEF) into the diesel exhaust. The mixing chamber is configured to permit mixing of the DEF with the diesel exhaust. The mixing chamber includes a static metallic mixer having a DEF hydrolysis catalyst coated thereon, wherein the DEF hydrolysis catalyst is configured to convert at least some of the DEF to $NH_3$. The SCR unit includes an SCR catalyst configured to facilitate reduction of nitrogen oxide (NOx) in the diesel exhaust with the $NH_3$. The flow channel is configured to direct flow of the diesel exhaust from the diesel oxidation catalyst unit, to the doser, to the mixing chamber, and to the SCR unit, where a first portion of the flow channel before the diesel exhaust reaches the doser is in direct thermal contact with a second portion of the flow channel that houses the SCR unit such that heat from the diesel exhaust before the diesel exhaust reaches the doser is passed to the SCR unit.

In one example, diesel exhaust reaches the first portion of the flow channel after passing through the diesel oxidation catalyst unit. In another example, the SCR unit is integrated with a diesel particulate filter (DPF), and the integrated SCR unit and DPF are configured to filter soot and passively oxidize the diesel exhaust simultaneously with NOx reduction. In another example, the SCR catalyst is a binary catalyst. In another example, system further includes a heating system configured to further heat the static mixer of the mixing chamber.

In another example, the system further includes a supplemental SCR catalyst unit including an ammonia slip catalyst (ASC), where the flow channel is configured to direct flow of the diesel exhaust from the SCR unit to the supplemental SCR catalyst unit. In another example, the system further includes a supplemental SCR catalyst unit including an ammonia slip catalyst (ASC), where the flow channel is configured to direct flow of the diesel exhaust from the mixing chamber to the supplemental SCR catalyst unit and then to the SCR unit. In another example, the doser is electro-activatable and electro-activation of the doser causes at least one of: reduction of droplet size of DEF introduced into the diesel exhaust, vaporization of the DEF to increase concentration of DEF droplets introduced into the diesel exhaust, formation of one or both of $H_2$ or $NH_3$ reductants during dosing of the diesel exhaust, increased uniformity of mixing of the DEF with the diesel exhaust, or increased DEF decomposition and reduced DEF deposit formation in the mixing chamber.

In another example, the first portion of the flow channel and the second portion of the flow channel are integrally formed together. In another example, the integrally formed first and second portions of the flow channel are located around a perimeter of the SCR unit such that the flow channel is configured to direct flow of the diesel exhaust around the perimeter of the SCR unit before flow of the diesel exhaust is directed to the doser. In another example, the mixing chamber comprises baffles configured to create a swirl flow pattern of the diesel exhaust before introduction of the DEF from the doser. In another example, the baffles are configured such that the diesel exhaust, after being mixed with DEF, continues in the swirl flow pattern into the static metallic mixer of the mixing chamber. In another example, at least a portion of the static metallic mixer of the mixing chamber is coated with the DEF hydrolysis catalyst, and the DEF hydrolysis catalyst coated on the metallic mixer is configured to facilitate hydrolysis of the mixed DEF and diesel exhaust according to the formula: $H_2NCONH_2 + H_2O \rightarrow 2NH_3 + CO_2$. In another example, the metallic mixer is configured such that electrical power supplied to the metallic mixer elevates or maintains a temperature of the DEF hydrolysis catalyst. In another example, the system further includes a control unit configured to control the electrical power supplied to the metallic mixer such that the temperature of the DEF hydrolysis catalyst is maintained independent of a temperature of the diesel exhaust.

In another example, the doser and the mixing chamber are configured such that the DEF is uniformly mixed in the diesel exhaust when the mixed DEF and diesel exhaust reach the SCR unit, and the SCR unit is configured to filter soot and passively oxidize the diesel exhaust simultaneously with NOx reduction. In another example, the SCR unit has a substrate with a porosity equal to or greater than about 65%, and the SCR catalyst is applied as a washcoat to an internal surface area of the substrate. In another example, the substrate comprises one or more of cordierite, silicon carbide, or aluminum titanate. In another example, the SCR unit has a substrate with a porosity equal to or greater than about 55%, and wherein the SCR catalyst is applied as a washcoat to an internal surface area of the substrate. In another example, the flow channel is further configured to direct flow of the diesel exhaust from the SCR unit to a tailpipe configured to expel the diesel exhaust.

In another embodiment, a method of treating diesel exhaust includes directing flow of diesel exhaust through a flow channel such that the diesel exhaust passes through a diesel oxidation catalyst unit, a doser, a mixing chamber, and a selective catalytic reduction (SCR) unit. The method further includes converting, by a diesel oxidation catalyst of the diesel oxidation catalyst unit, a portion of diesel exhaust into one or more of water or carbon dioxide, introducing, by the doser, a diesel exhaust fluid (DEF) into the diesel exhaust. The method further includes mixing, by a static metallic mixer in the mixing chamber, the DEF with the diesel exhaust, where the static metallic mixer has a DEF hydrolysis catalyst coated thereon and the DEF hydrolysis catalyst is configured to convert at least some of the DEF to $NH_3$. The method further includes facilitating, by an SCR catalyst of the SCR unit, reduction of nitrogen oxide (NOx) in the diesel exhaust with the $NH_3$. The diesel exhaust passes a first portion of the flow channel before the diesel exhaust reaches the doser, a second portion of the flow channel houses the SCR unit, and the first portion of the flow channel is in direct thermal contact with the second portion of the flow channel such that heat from the diesel exhaust before the diesel exhaust reaches the doser is passed to the SCR unit.

In one example, the first portion of the flow channel and the second portion of the flow channel are integrally formed together, and wherein the integrally formed first and second portions of the flow channel are located around a perimeter of the SCR unit such that the flow channel is configured to direct flow of the diesel exhaust around the perimeter of the SCR unit before flow of the diesel exhaust is directed to the doser.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein:

FIG. 6A depicts another embodiment of a TICA exhaust system arranged such that diesel exhaust passes around a portion of the flow channel housing the SCR unit before it passes to the doser, in accordance with embodiments described herein;

FIG. 6B depicts a variation of the embodiment of the TICA exhaust system depicted in FIG. 6A;

FIG. 7 depicts diesel exhaust flow through the embodiment of the TICA exhaust system depicted in FIG. 6A.

DETAILED DESCRIPTION

Figure 1A:
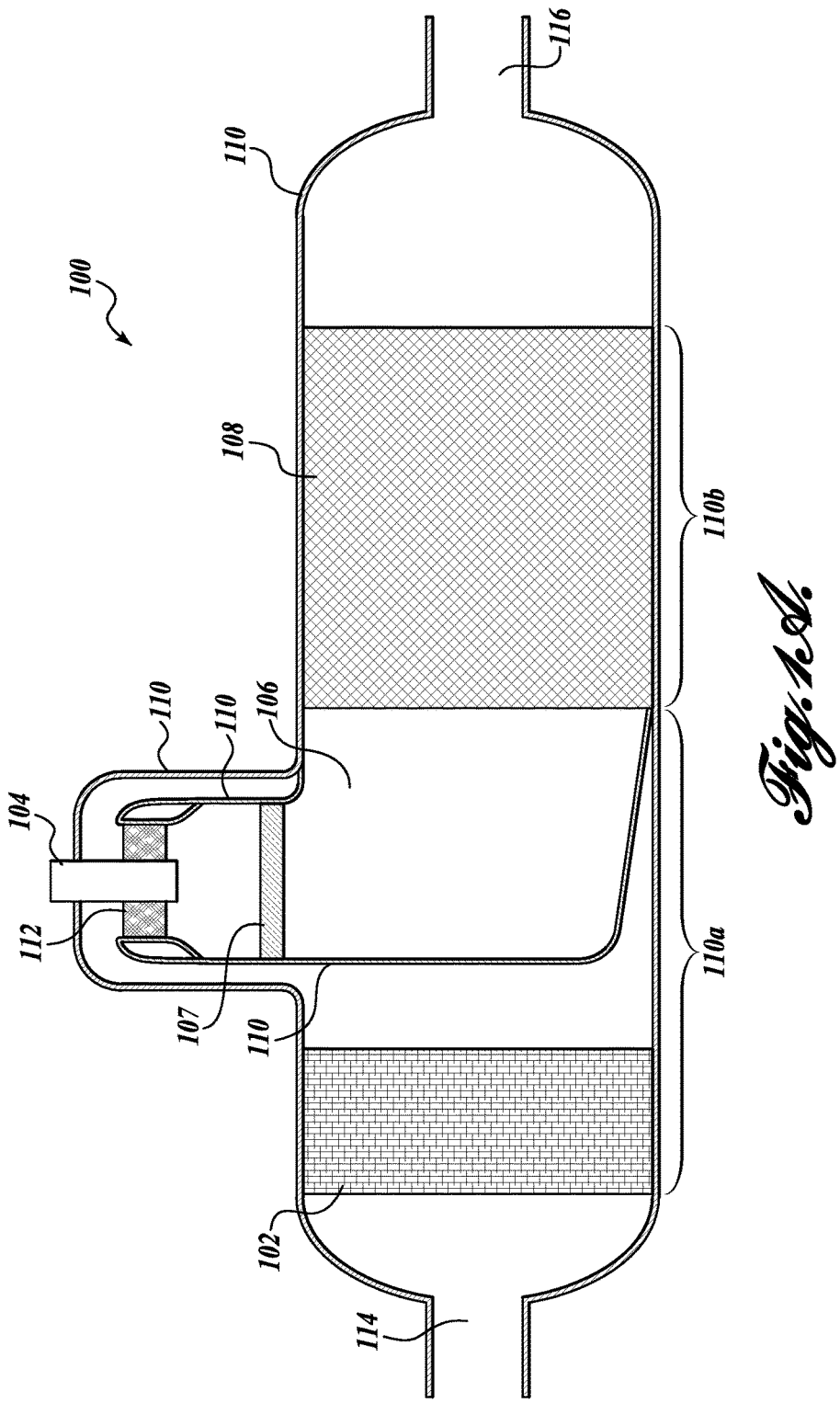
FIG. 1A depicts an embodiment of a thermally integrated compact aftertreatment (TICA) exhaust system, in accordance with embodiments described herein.

The detailed description set forth below in connection with the appended drawings is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the invention to the precise forms disclosed. Similarly, any steps described herein may be interchangeable with other steps, or combinations of steps, in order to achieve the same or substantially similar result.

Embodiments of the present disclosure are directed to thermally integrated catalyst aftertreatment (TICA) diesel exhaust systems. One goal of an engine aftertreatment system (EAS) is to close couple the EAS for thermal management benefit. This goal can be accomplished while also making the EAS compact. Some associated problems are due primarily to performance and durability concerns when the EAS is exposed to potentially damaging extreme temperatures (repeatedly and/or for extended periods), as well as problems directly related to making the EAS smaller. One of the more challenging problems associated with compact EASs is an inherent inefficiency associated with diesel exhaust fluid (DEF) decomposition (e.g., urea decomposition) by conventional means, to produce $NH_3$ reductant that is needed for NOx emissions control.

To address these challenges, some attempts have been made to engage in a variety of activities that are invariably based on the concept of making minimal changes, while building on current technology. This measured evolutionary approach has enlisted a number of strategies, such as computational fluid dynamics (CFD) modeling to gain a predictive database from which innovation may flow, catalyst development of more thermally stable zeolites and other materials, combined DPF and SCR units to form SCRF devices, compact mixer designs for DEF decomposition, and control and on-board diagnostic (OBD) strategies to avoid fault codes that result from inadequacies of the system.

However, with even more stringent emissions regulations anticipated in the near future, along with the omnipresent drive for improved fuel economy, new approaches for addressing these challenges are needed.

In one embodiment disclosed herein, a TICA exhaust system includes a flow channel that directs flow of the diesel exhaust from a diesel oxidation catalyst unit, to a doser that introduces diesel exhaust fluid (DEF) into the diesel exhaust, to a mixing chamber, and to a selective catalytic reduction (SCR) unit. A first portion of the flow channel before the diesel exhaust reaches the doser is in direct thermal contact with a second portion of the flow channel that houses the SCR unit such that heat from the diesel exhaust before the diesel exhaust reaches the doser is passed to the SCR unit. The first and second portions of the flow channel are in direct thermal contact if they are either integrally formed together or in direct physical contact with each other.

While urea may be a preferred DEF used in the automotive industry for reducing nitrogen oxides in diesel exhaust, the present disclosure is not limited to apparatus for use in injecting a urea solution. Other forms of DEF, such as nitrogen-oxides reductant solutions (e.g., ammonia), will benefit from injection using the provided examples of the diffusion apparatus. Furthermore, the provided examples are not limited to the injection of a nitrogen-oxides reductant solution, but are useful for providing passage between any liquid injector and a gaseous flow.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well known aspects have not been described in detail in order to not unnecessarily obscure various aspects of the present disclosure. Further, it will be appreciated that embodiments of the present disclosure may employ any combination of features described herein.

FIG. 1A depicts an embodiment of a TICA exhaust system 100 usable in an EAS. The TICA exhaust system 100 includes a diesel oxidation catalyst unit 102, a doser 104, a mixing chamber 106 that includes a static metallic mixer 107, and a selective catalytic reduction (SCR) unit 108. The TICA exhaust system 100 also includes a flow channel 110 configured to direct flow of the diesel exhaust from the diesel oxidation catalyst unit 102, to the doser 104, to the mixing chamber 106, and to the SCR unit 108. The diesel oxidation catalyst unit 102 includes a diesel oxidation catalyst configured to convert a portion of diesel exhaust into one or more of water or carbon dioxide. In some embodiments, the diesel oxidation catalyst is an oxidation catalyst that oxidizes diesel pollutants (e.g., carbon monoxide, gas phase hydrocarbons, organic fraction of diesel particulates) into products that are harmless or less harmful (e.g., water or carbon dioxide). In one example, hydrocarbons can be oxidized to form carbon dioxide and water vapor. In another example, carbon monoxide can be oxidized to form carbon dioxide.

The doser 104 is configured to introduce DEF into the diesel exhaust. The mixing chamber 106 is configured to permit mixing of the DEF with the diesel exhaust. In the embodiment shown, the mixing chamber 106 includes baffles 112 configured to create a swirl flow pattern of the diesel exhaust. In some embodiments, the baffles 112 are configured to create the swirl flow pattern of the diesel exhaust before introduction of the DEF from the doser 104. In some embodiments, the doser 104 and the mixing chamber 106 are configured such that DEF introduced by the doser 104 is uniformly mixed with the diesel exhaust before the mixed diesel exhaust and DEF enter the SCR unit 108.

In the embodiment shown in FIG. 1A, the mixing chamber 106 includes the static metallic mixer 107 to aid in the mixing of the DEF introduced by the doser 104 with the diesel exhaust. In some embodiments, the static metallic mixer 107 is a wire mesh static metallic mixer. In some examples, the wire mesh static metallic mixer has one or more of patterns, curves, bends, and/or any other feature that increases the likelihood that diesel exhaust mixing with the DEF. In some embodiments, the static metallic mixer 107 is a tortuous path static mixer. Other examples of mixing chambers are described, for example, in U.S. patent application Ser. No. 14/486,217, which is hereby incorporated by reference in its entirety.

In some embodiments, a DEF hydrolysis catalyst is coated on the static metallic mixer 107 (e.g., coated on the entire static metallic mixer 107 or coated on at least a portion of the static metallic mixer 107). The DEF hydrolysis catalyst is configured to rapidly and more completely decompose the DEF before the mixed DEF and diesel exhaust reach the SCR unit 108. In one example, the DEF hydrolysis catalyst is configured to convert at least some of the DEF to $NH_3$. In some embodiments, the coating is configured to minimize or eliminate HNCO or deposit formation in the mixing chamber 106 and the SCR unit 108. In one embodiment, at least a portion of the internal wall surfaces, up to the entire portion of the internal wall surfaces, of the mixing chamber 106 and connecting pipes can be coated with a DEF hydrolysis catalyst to enhance conversion of DEF to gaseous ammonia and to minimize DEF deposit formation.

In one embodiment, the DEF hydrolysis catalyst is an 8 mol % yttria-stabilized zirconia. The catalyst is formed into a washcoat formulation that comprises 3.0 g catalyst, 4.4 g polyethylene oxide binder, 0.5 g polyethylene oxide/polypropylene oxide surfactant, and 2.2 g water suspension medium. The washcoat formulation is stirred vigorously by hand, allowed to degas for 30 minutes, employed in dip coating pieces of wire mesh, and retrieved from a sample wire mesh mixer. The coated wire is air dried in a fume hood for 15 minutes, then transferred to an oven for drying and sintering of the catalyst particle to form a coherent coating, as follows: 15 minutes at 105° C. and 60 minutes at 500° C. Results from scanning electron microscope and energy-dispersive X-ray spectroscopy analysis of the resulting wash coat were analyzed to confirm the effectiveness of the washcoat application of portions of a wire mesh mixer. The same washcoat formulation was used to coat an alumina thermogravimetric analysis (TGA) pan. The catalyst-coated pan produced similar TGA results for DEF hydrolysis as using pristine catalyst powder added to 50% DEF solution in catalyst screening studies. Other examples of DEF hydrolysis catalysts are described, for example, in U.S. patent application Ser. No. 14/486,858, which is hereby incorporated by reference in its entirety.

The SCR unit 108 includes an SCR catalyst configured to facilitate hydrolysis of a portion of the thermolysis decomposition product from DEF. In some embodiments, chemical processes that occur during the DEF atomization and SCR process include:

$$H_2O \text{ evaporation} \ldots \text{(endothermic)} \quad (1)$$

$$DEF \rightarrow NH_3 + HNCO \ldots \text{(endothermic)} \quad (2)$$

$$HNCO + H_2O \rightarrow NH_3 + CO_2 \ldots \text{(hydrolysis)} \quad (3)$$

Both reactions (1) and (2) are thermal processes and, as such, they are directly dependent upon engine exhaust flow conditions. However, at or above 300° C., these reactions typically proceed rapidly. Reaction (3) is a limiting step, as it proceeds slowly in the gas phase and requires contact with a catalyst surface to achieve reasonable reaction rates. An SCR catalyst can serve this purpose under these circumstances. This is one reason for inclusion of metal oxides of titanium, tungsten and zirconium in SCR catalyst formulations. The SCR catalyst can play a crucial role in hydrolyzing HNCO and providing more $NH_3$ for the SCR reaction to proceed. Also, HNCO hydrolysis helps to prevent significant localized accumulation of HNCO that may result in deposit formation. The primary function of the SCR is NOx reduction reaction. Any hydrolysis of DEF or DEF byproduct carried out by the SCR is undesirable and only necessitated by a failure to obtain rapid and more complete decomposition and mixing of DEF. SCR catalyst size can be reduced significantly if a method can be found to efficiently perform reaction (3) and/or directly hydrolyze DEF, such as urea, as shown in reaction (4):

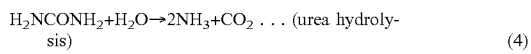

$$H_2NCONH_2 + H_2O \rightarrow 2NH_3 + CO_2 \ldots \text{(urea hydrolysis)} \quad (4)$$

When atomized DEF solution comes into contact with surfaces (i.e., impinges on the surfaces) due to mal-distribution of DEF, the spray will have a cooling effect. With lower temperatures, the rate of the thermally driven reactions (1) and (2) are negatively impacted. Ultimately, this can lead to deposit formation. This presents a major challenge for achieving efficient mixing in compact EAS. Impingement is directly linked with both DEF deposit formation and mal-distribution of flow and $NH_3$ uniformity. Static mixers are routinely used in EASs to achieve mixing of atomized DEF solution droplets and engine exhaust. Despite the common occurrence of DEF deposits at or in the vicinity of the mixer, and even a foot or more downstream of the mixer, the EAS can be operated to meet emission standards.

The SCR unit 108 (and any other SCR unit described herein) can be coated with an SCR catalyst. In one embodiment, the SCR catalyst is configured to facilitate reduction of nitrogen oxide (NOx) in the diesel exhaust with the $NH_3$. In some embodiments, the SCR unit 108 is integrated with a diesel particulate filter (DPF) unit to form an SCRF unit. In general, a DPF is a device designed to remove diesel particulate matter or soot from the diesel exhaust. In some embodiments, the SCRF unit (i.e., the integrated SCR unit 108 and DPF) is configured to filter soot and passively oxidize the diesel exhaust simultaneously with NOx reduction.

The flow channel 110 includes an inlet 114 and an outlet 116. In some embodiments, the TICA exhaust system 100 is placed on a vehicle such that diesel exhaust from the engine enters the TICA exhaust system 100 through the inlet 114 and exits the TICA exhaust system 100 toward a tail pipe of the vehicle. The flow channel 110 directs flow of the diesel exhaust from the inlet 114 to the diesel oxidation catalyst unit 102, to the doser 104, to the mixing chamber 106, to the SCR unit 108, and out of the outlet 116.

A first portion of the flow channel 110a is in direct thermal contact with a second portion of the flow channel 110b. The first portion of the flow channel 110a is located such that diesel exhaust flowing from the inlet 114 to the outlet 116 passes by the first portion of the flow channel 110a before the diesel exhaust reaches the doser 104. The second portion of the flow channel 110b houses the SCR unit 108. The first portion of the flow channel 110a is in direct thermal contact with the second portion of the flow channel 110b and they are in direct physical contact with each other. Thus, before the diesel exhaust reaches the doser 104, heat from the diesel exhaust is passed to the SCR unit 108 via the first portion of the flow channel 110a and the second portion of the flow channel 110b.

Figure 1B:
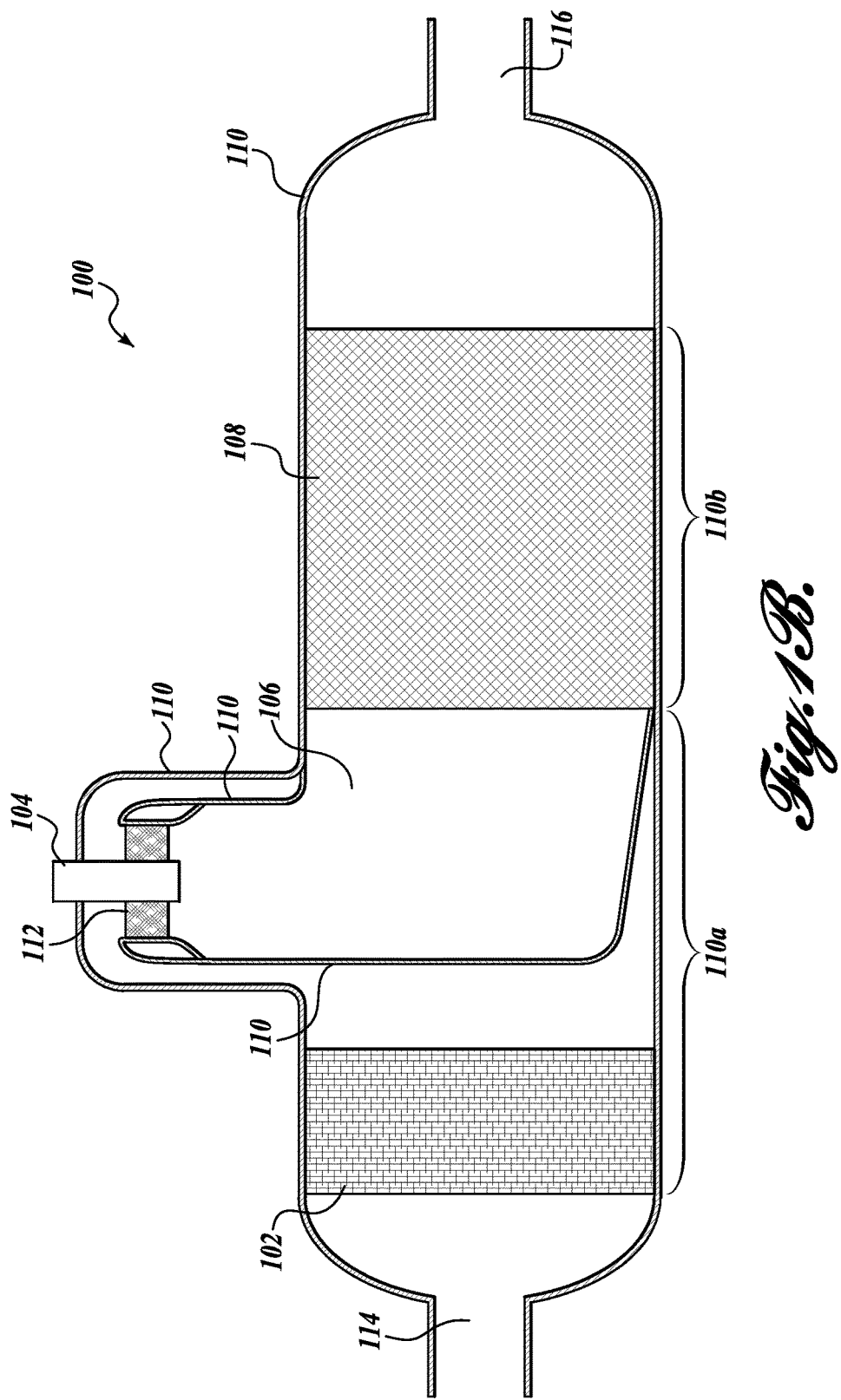
FIG. 1B depicts a variation of the embodiment of the TICA exhaust system depicted in FIG. 1A.

A variation of the TICA exhaust system 100 without the static metallic mixer 107 is depicted in FIG. 1B. In this embodiment, the DEF reduction and possible mixing of the DEF and diesel exhaust may occur in the SCR unit 108. However, such an arrangement may not be ideal because the absence of the static metallic mixer 107 may slow the decomposition rate of DEF in the mixing chamber 106, thus leading to accumulation of HNCO that may result in deposit formation in the mixing chamber 106 or the SCR unit 108.

Figure 2:
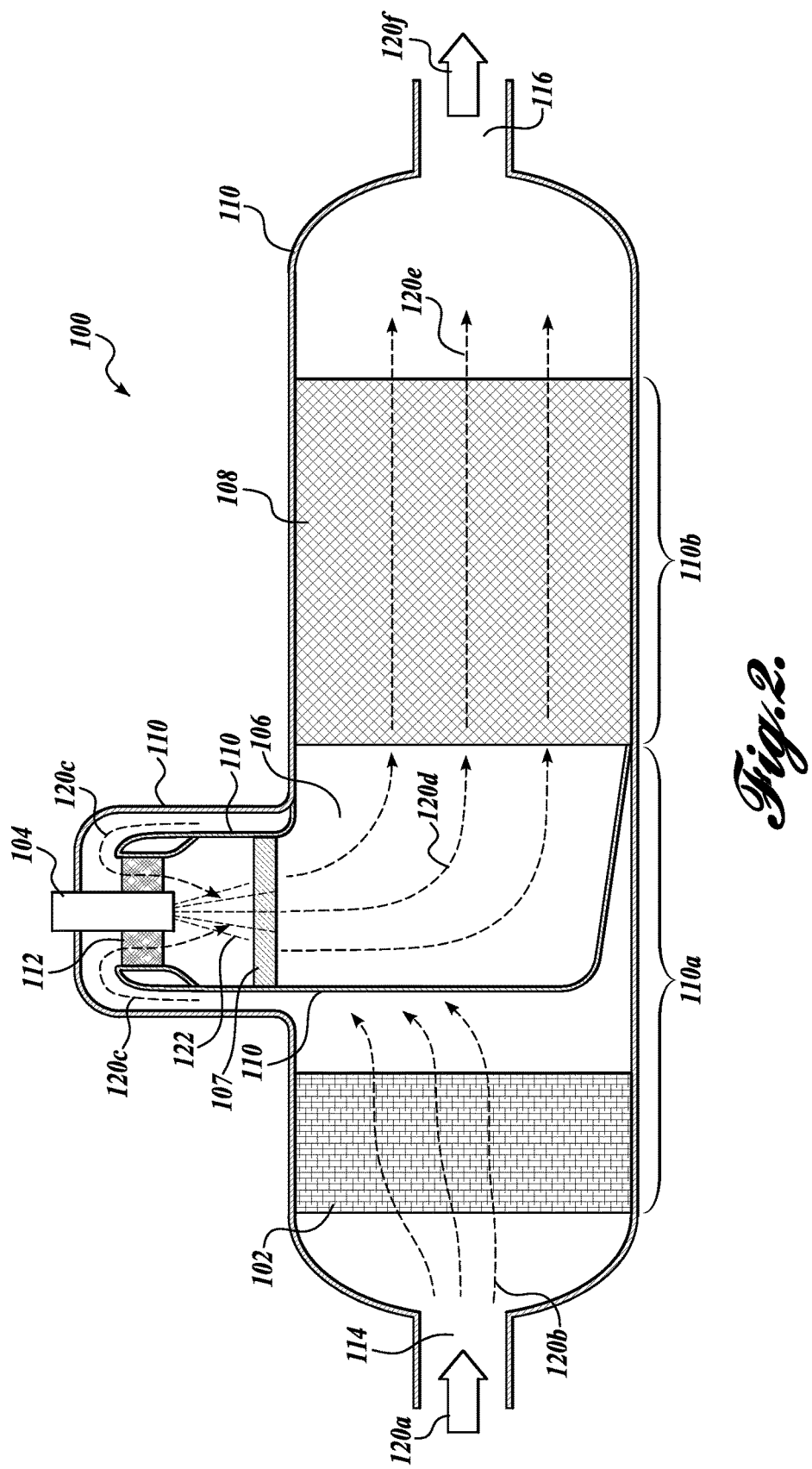
FIG. 2 depicts diesel exhaust flow through the embodiment of the TICA exhaust system depicted in FIG. 1A.

An example of diesel exhaust flow through the flow channel 110 of the TICA exhaust system 100 depicted in FIG. 1A is shown in FIG. 2. Portions of the flow of diesel exhaust flowing through the flow channel 110 are labeled as diesel exhaust 120a-f; however, it should be understood that diesel exhaust 120a-f portions are representative of a continuous flow and are not discrete pockets of diesel exhaust. The diesel exhaust 120a enters the inlet 114 of the TICA exhaust system 100. In some embodiments, the diesel exhaust 120a enters the inlet 114 from an engine of a vehicle or from another EAS between the engine and the TICA exhaust system 100.

The diesel exhaust 120b passes through the diesel oxidation catalyst unit 102. Heat from the diesel exhaust 120b passes to the first portion of the flow channel 110a before, during, or after the diesel exhaust 120b passes through the diesel oxidation catalyst unit 102. The first portion of the flow channel 110a is in direct thermal contact with the second portion of the flow channel 110b. The direct thermal contact enables heat passed from the diesel exhaust 120b to the first portion of the flow channel 110a to pass to the second portion of the flow channel 110b and to the SCR unit 108. In this way, heat from the diesel exhaust 120b is used to directly heat the SCR catalyst and the parts associated with the in the SCR unit 108 before the diesel exhaust 120b reaches the doser 104. This also cools the diesel exhaust 120b somewhat before the process of DEF dosing, mixing, and decomposition.

The diesel exhaust 120c passes the doser 104 and DEF 122 is introduced into the diesel exhaust 120c. In some embodiments, the doser 104 is an electro-activatable doser. In some embodiments, electro-activatable dosers are configured to cause at least one of: reduction of droplet size of DEF introduced into the diesel exhaust; vaporization of the DEF to increase concentration of DEF droplets introduced into the diesel exhaust; formation of one or both of $H_2$ or $NH_3$ reductants during dosing of the diesel exhaust; increased uniformity of mixing of the DEF with the diesel exhaust; or increased DEF decomposition and reduced DEF formation in the mixing chamber. Examples of electro-activatable dosers are discussed in U.S. patent application Ser. No. 14/935,094, the contents of which are hereby incorporated by reference in their entirety.

In one embodiment, the diesel exhaust 120c passes through baffles 112 before the DEF 122 is introduced into the diesel exhaust 120c. The baffles 112 are configured to create a swirl pattern to increase the efficiency of mixing of the DEF 122 with the diesel exhaust 120c. Once DEF 122 is introduced, the diesel exhaust 120d proceeds through the mixing chamber 106. The mixing chamber 106 is configured to permit mixing of the diesel exhaust 120d with the DEF 122. In the embodiment depicted in FIG. 2, the mixing chamber 106 includes the static metallic mixer 107 having a DEF hydrolysis catalyst coated thereon. The DEF hydrolysis catalyst is configured to convert at least some of the DEF 122 to $NH_3$ before the flow of diesel exhaust 120d and DEF 122 reaches the SCR unit 108. In some embodiments, the mixing chamber 106 includes wall texturing (e.g., dimples) or other features configured to create currents in the flow of diesel exhaust 120d and DEF 122 that increase the uniformity of the mixture of the DEF 122 in the diesel exhaust 120d.

The mixed diesel exhaust 120e and DEF 122 passes through the SCR unit 108. The SCR unit 108 includes an SCR catalyst configured to facilitate reduction of NOx in the diesel exhaust with the $NH_3$. In some embodiments, the SCR catalyst is a binary catalyst. In some embodiments, the SCR catalyst is coated on the SCR unit 108 to achieve efficient reduction of NOx in the diesel exhaust with the $NH_3$ (see equation (4)). In some embodiments, the SCR unit 108 is integrated with a diesel particulate filter (DPF). In some embodiments, the combined SCR unit 108 and the DPF are configured to filter soot and passively oxidize the diesel exhaust simultaneously with nitrogen oxide (NOx) reduction. In some embodiments, the SCR unit has a substrate with a porosity equal to or greater than about 65% and the SCR catalyst is applied as a washcoat to an internal surface area of the substrate. In some embodiments, the SCR unit has a substrate with a porosity equal to or greater than about 55% and the SCR catalyst is applied as a washcoat to an internal surface area of the substrate. Porosity is about a particular percentage (e.g., 55%, 65%) if it is within 2% of the particular percentage (e.g., 55%±2%, 65%±2%). In one example, such a substrate includes one or more of cordierite or silicon carbide. After passing through the SCR unit 108, the diesel exhaust 120f passes on to the outlet 116 of the TICA exhaust system 100.

Figure 3:
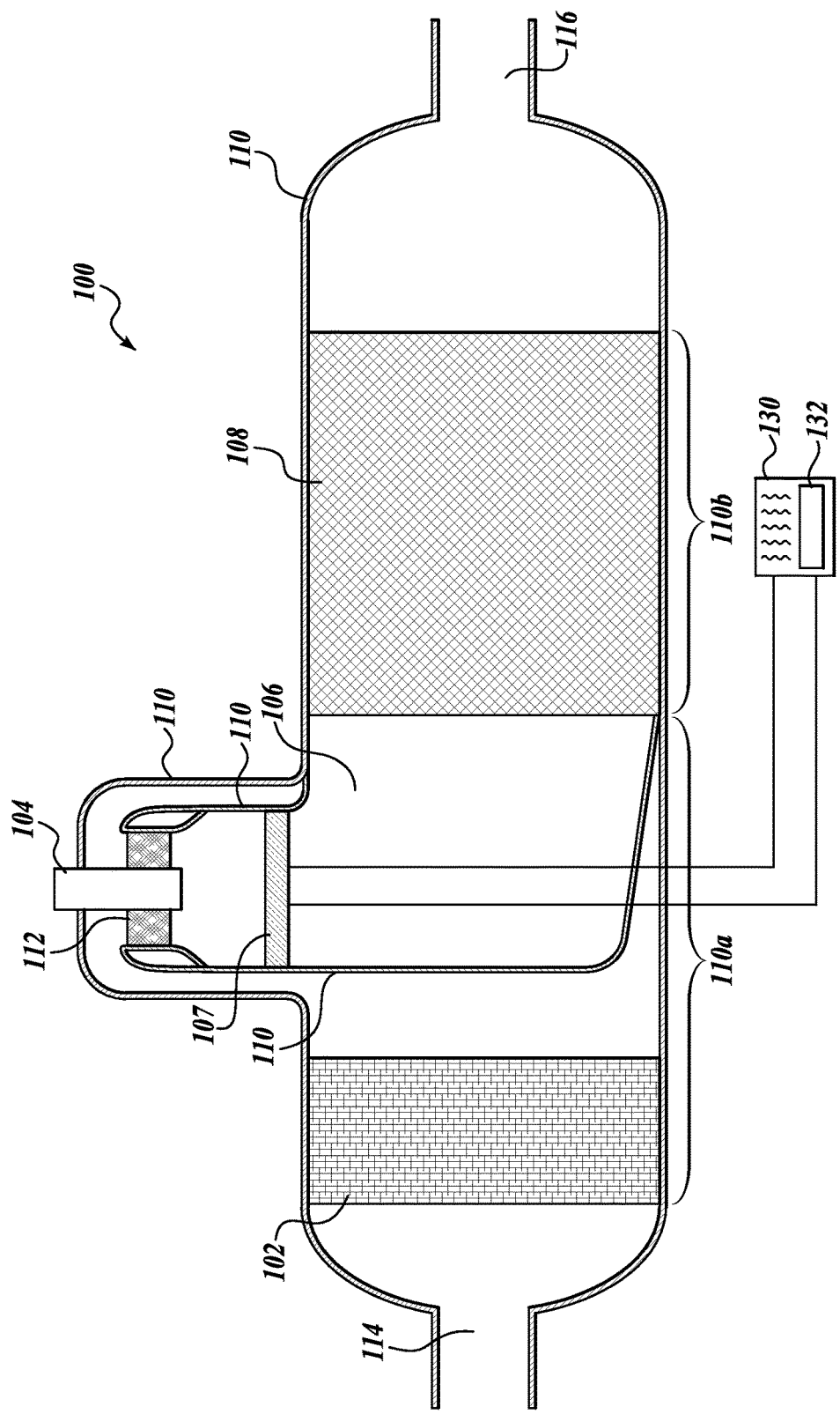
FIG. 3 depicts a variation of the embodiment of the TICA exhaust systems described herein with a heat system configured to heat a metallic mixer in a mixing chamber of the TICA exhaust system.

In some embodiments, the heat transferred from the first portion of the flow channel 110a to the second portion of the flow channel 110b heats the SCR catalyst in the SCR unit 108 such that the SCR catalyst is heated before the mixed diesel exhaust 120e and DEF 122 reaches the SCR catalyst. In other embodiments, as depicted in FIG. 3, the TICA exhaust system 100 includes a heat system 130 configured to heat the static metallic mixer 107. In some examples, the heat system 130 is an integral part of the TICA exhaust system 100, a removable part of the TICA exhaust system 100, a part of a vehicle on which the TICA exhaust system is installed, and the like. In some embodiments, the heat system 130 is an electrical heat system configured to supply electrical power to the static metallic mixer 107 to elevate or maintain a temperature of the DEF hydrolysis catalyst coated on the static metallic mixer 107.

In some embodiments, the TICA exhaust system 100 includes a control unit 132 configured to control the electrical power supplied to the static metallic mixer 107 such that the temperature of the DEF hydrolysis catalyst is maintained independent of any heat transferred from the first portion of the flow channel 110a via the second portion of the flow channel 110b to the SCR unit 108. In some examples, the heat system 130 includes the control unit 132 (as shown in FIG. 3). In other embodiments, the heat system 130 is included in the TICA exhaust system 100 separate from the heat system 130 or the heat system 130 is included in a vehicle on which the TICA exhaust system 100 is installed. Other examples of static metallic mixer heating systems are described, for example, in U.S. patent application Ser. No. 14/486,858 and U.S. patent application Ser. No. 14/486,217, which are hereby incorporated by reference in their entirety. Any of the static metallic mixer heating systems may be used with any of the other embodiments of TICA exhaust systems disclosed herein.

Figure 4:
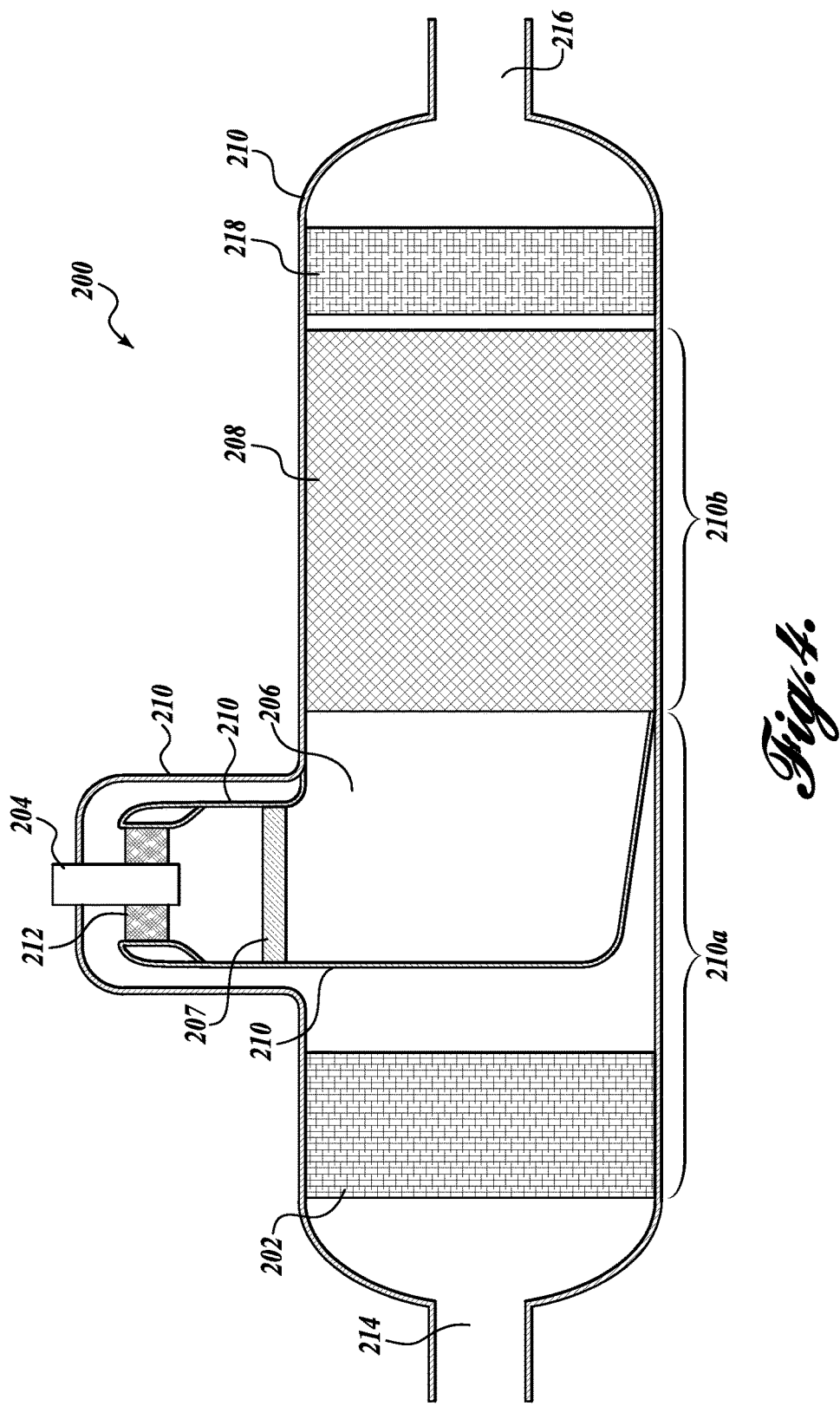
FIG. 4 depicts another embodiment of a TICA exhaust system with a second SCR unit, in accordance with embodiments described herein.

Another embodiment of a TICA exhaust system 200 is depicted in FIG. 4. The TICA exhaust system 200 includes a diesel oxidation catalyst unit 202, a doser 204, a mixing chamber 206 having a static metallic mixer 207, and an SCR unit 208. The diesel oxidation catalyst unit 202, the doser 204, the mixing chamber 206, the static metallic mixer 207, and the SCR unit 208 are similar to the diesel oxidation catalyst unit 102, the doser 104, the mixing chamber 106, the static metallic mixer 107, and the SCR unit 108 of the TICA exhaust system 100. The various embodiments and functions of the diesel oxidation catalyst unit 102, the doser 104, the mixing chamber 106, the static metallic mixer 107, and the SCR unit 108 of the TICA exhaust system 100 also apply to the diesel oxidation catalyst unit 202, the doser 204, the mixing chamber 206, the static metallic mixer 207, and the SCR unit 208.

The TICA exhaust system 200 also includes a flow channel 210 configured to direct flow of the diesel exhaust from the diesel oxidation catalyst unit 202 to the doser 204, to the mixing chamber 206, and to the SCR unit 208. A first portion of the flow channel 210a is in direct thermal contact with a second portion of the flow channel 210b. The first portion of the flow channel 210a is located such that diesel exhaust flowing from an inlet 214 to an outlet 216 of the TICA exhaust system 200 passes by the first portion of the flow channel 210a before the diesel exhaust reaches the doser 204. The second portion of the flow channel 210b houses the SCR unit 208. The first portion of the flow channel 210a is in direct thermal contact with the second portion of the flow channel 210b because they are in direct physical contact with each other. Thus, before the diesel exhaust reaches the doser 204, heat from the diesel exhaust is passed to the SCR unit 208 via the first portion of the flow channel 210a and the second portion of the flow channel 210b.

The TICA exhaust system 200 also includes a supplemental SCR catalyst unit 218. The supplemental SCR catalyst unit 218 includes an ammonia slip catalyst (ASC). The inclusion of the supplemental SCR catalyst unit 218 may be helpful in circumstances where the SCR unit 208 alone is not sufficient to fully facilitate hydrolysis of the mixed DEF and diesel exhaust. In one example, the SCR unit 208 is an SCRF with an integrated DPF. In the embodiment shown in FIG. 4, the flow channel 210 is configured to direct flow of the diesel exhaust from the SCR unit 208 to the supplemental SCR catalyst unit 218. In another embodiment not shown, the supplemental SCR catalyst unit 218 is located before the SCR unit 208 such that the flow channel 210 is configured to direct flow of the diesel exhaust from the supplemental SCR catalyst unit 218 to the SCR unit 208.

Figure 5:
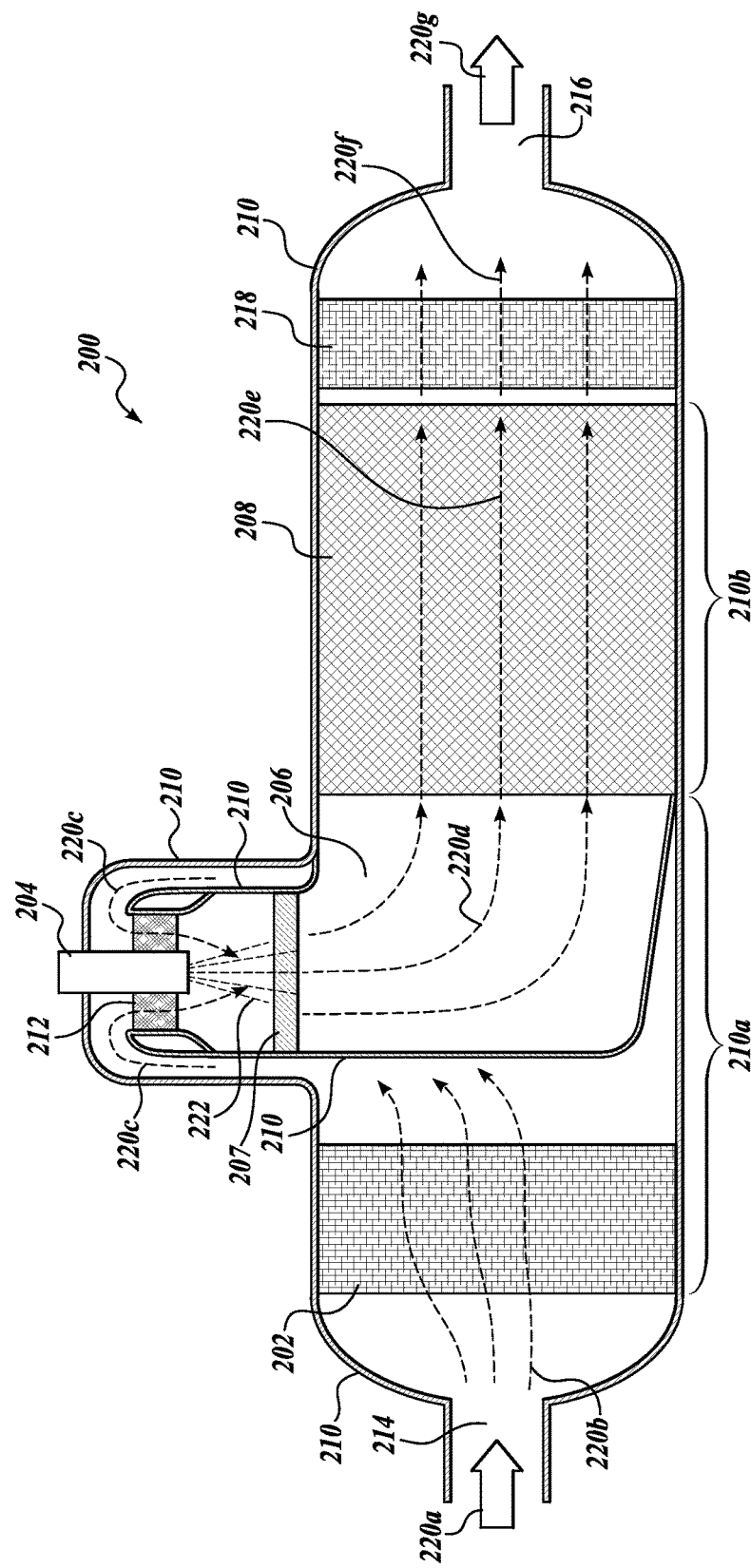
FIG. 5 depicts diesel exhaust flow through the embodiment of the TICA exhaust system depicted in FIG. 4.

An example of diesel exhaust flow through the flow channel 210 of the TICA exhaust system 200 is shown in FIG. 5. Portions of the flow of diesel exhaust flowing through the flow channel 210 are labeled as diesel exhaust 220a-g; however, it should be understood that diesel exhaust 220a-g portions are representative of a continuous flow and are not discrete pockets of diesel exhaust. The diesel exhaust 220a enters the inlet 214 of the TICA exhaust system 200. In some embodiments, the diesel exhaust 220a enters the inlet 214 from an engine of a vehicle or from another EAS between the engine and the TICA exhaust system 200.

The diesel exhaust 220b passes through the diesel oxidation catalyst unit 202. Heat from the diesel exhaust 220b passes to the first portion of the flow channel 210a before, during, or after the diesel exhaust 220b passes through the diesel oxidation catalyst unit 202. The first portion of the flow channel 210a is in direct thermal contact with the second portion of the flow channel 210b. The direct thermal contact enables heat passed from the diesel exhaust 220b to the first portion of the flow channel 210a to pass to the second portion of the flow channel 210b and to the SCR unit 208. In this way, heat from the diesel exhaust 220b is used to directly heat the SCR catalyst and the parts associated with the in the SCR unit 208 before the diesel exhaust 220b reaches the doser 204. This also cools the diesel exhaust 220b somewhat before the process of DEF dosing, mixing, and decomposition.

The diesel exhaust 220c passes the doser 204 and DEF 222 is introduced into the diesel exhaust 220c. In one embodiment, the diesel exhaust 220c passes through baffles 212 before the DEF 222 is introduced into the diesel exhaust 220c. Once DEF 222 is introduced, the diesel exhaust 220d proceeds through the mixing chamber 206. The mixing chamber 206 is configured to permit mixing of the diesel exhaust 220d with the DEF 222. In the embodiment depicted in FIG. 5, the mixing chamber 206 includes the static metallic mixer 207 having a DEF hydrolysis catalyst coated thereon. The DEF hydrolysis catalyst is configured to convert at least some of the DEF 222 to $NH_3$ before the flow of diesel exhaust 220d and DEF 222 reaches the SCR unit 208. The mixed diesel exhaust 220e and DEF 222 passes through the SCR unit 208. The SCR unit 208 includes an SCR catalyst configured to facilitate reduction of NOx in the diesel exhaust with the $NH_3$. The diesel exhaust 220f passes through the supplemental SCR catalyst unit 218. The supplemental SCR catalyst unit 218 includes a catalyst (e.g., ASC) configured to further decompose any DEF mixed with the diesel exhaust 220f. After passing through the supplemental SCR catalyst unit 218, the diesel exhaust 220g passes on to the outlet 216 of the TICA exhaust system 200.

Another embodiment of a TICA exhaust system 300 is depicted in FIG. 6A. The TICA exhaust system 300 includes a diesel oxidation catalyst unit 302, a doser 304, a mixing chamber 306 that includes a static metallic mixer 307, and an SCR unit 308. The diesel oxidation catalyst unit 302, the doser 304, the mixing chamber 306, the static metallic mixer 307, and the SCR unit 308 are similar to the diesel oxidation catalyst unit 102, the doser 104, the mixing chamber 106, the static metallic mixer 107, and the SCR unit 108 of the TICA exhaust system 100. The various embodiments and functions of the diesel oxidation catalyst unit 102, the doser 104, the mixing chamber 106, the static metallic mixer 107, and the SCR unit 108 of the TICA exhaust system 100 also apply to the diesel oxidation catalyst unit 302, the doser 304, the mixing chamber 306, the static metallic mixer 307, and the SCR unit 308.

The TICA exhaust system 300 also includes a flow channel 310 configured to direct flow of the diesel exhaust from the diesel oxidation catalyst unit 302, to the doser 304, to the mixing chamber 306, and to the SCR unit 308. A first portion of the flow channel 310a is in thermal contact with a second portion of the flow channel 310b. The first portion of the flow channel 310a is located such that diesel exhaust flowing from an inlet 314 to an outlet 316 of the TICA exhaust system 300 passes by the first portion of the flow channel 310a before the diesel exhaust reaches the doser 304. The second portion of the flow channel 310b houses the SCR unit 308. The first portion of the flow channel 310a is in direct thermal contact with the second portion of the flow channel 310b because they are integrally formed together. Thus, before the diesel exhaust reaches the doser 304, heat from the diesel exhaust is passed to the SCR unit 308 via the first portion of the flow channel 310a and the second portion of the flow channel 310b.

In the embodiment shown in FIG. 6A, the first portion of the flow channel 310a and the second portion of the flow channel 310b are integrally formed together. In some embodiments, including the embodiment shown in FIG. 6A, the integrally formed first portion of the flow channel 310a and second portion of the flow channel 310b are located around a perimeter of the SCR unit 308. This allows the flow channel 310 to direct flow of the diesel exhaust around the perimeter of the SCR unit before flow of the diesel exhaust is directed to the doser.

A variation of the TICA exhaust system 300 without the static metallic mixer 307 is depicted in FIG. 6B. In this embodiment, the DEF decomposition and possible mixing of the DEF and diesel exhaust may be substantially incomplete before entering the SCR unit 308. However, such an arrangement may not be ideal because the absence of the static metallic mixer 307 may slow the decomposition rate of DEF in the mixing chamber 306, thus leading to accumulation of HNCO that may result in deposit formation in the mixing chamber 306 or the SCR unit 308.

An example of diesel exhaust flow through the flow channel 310 of the TICA exhaust system 300 depicted in FIG. 6A is shown in FIG. 7. Portions of the flow of diesel exhaust flowing through the flow channel 310 are labeled as diesel exhaust 320a-g; however, it should be understood that diesel exhaust 320a-g portions are representative of a continuous flow and are not discrete pockets of diesel exhaust. The diesel exhaust 320a enters the inlet 314 of the TICA exhaust system 300. In some embodiments, the diesel exhaust 320a enters the inlet 314 from an engine of a vehicle or from another EAS between the engine and the TICA exhaust system 300.

The diesel exhaust 320b passes through the diesel oxidation catalyst unit 302. The diesel exhaust 320c then passes by the first portion of the flow channel 310a, which is integrally formed with the second portion of the flow channel 310b. In some embodiments, as shown in the embodiment in FIG. 7, the integrally formed first and second portions of the flow channel 310a and 310b are cylindrical in shape with the SCR unit 308 on the inside of the cylindrical shape and the diesel exhaust 320c flowing around the outside of the cylindrical shape. Heat from the diesel exhaust 320c passes to the first portion of the flow channel 310a after the diesel exhaust 320c passes through the diesel oxidation catalyst unit 302 and before the diesel exhaust 320c reaches the doser 304. The first portion of the flow channel 310a is in direct thermal contact with the second portion of the flow channel 310b. The direct thermal contact enables heat passed from the diesel exhaust 320c to the first portion of the flow channel 310a to pass to the second portion of the flow channel 310b and to the SCR unit 308. In this way, heat from the diesel exhaust 320c is used to directly heat the SCR catalyst and the parts associated with the SCR unit 308 before the diesel exhaust 320c reaches the doser 304. This also cools the diesel exhaust 320c somewhat before the process of DEF dosing, mixing, and decomposition.

The diesel exhaust 320d passes the doser 304 and DEF 322 is introduced into the diesel exhaust 320d. In one embodiment, the diesel exhaust 320d passes through baffles 312 before the DEF 322 is introduced into the diesel exhaust 320d. Once DEF 322 is introduced, the diesel exhaust 320e proceeds through the mixing chamber 306. The mixing chamber 306 is configured to permit mixing of the diesel exhaust 320e with the DEF 322. In the embodiment depicted in FIG. 7, the mixing chamber 306 includes the static metallic mixer 307 having a DEF hydrolysis catalyst coated thereon. The DEF hydrolysis catalyst is configured to convert at least some of the DEF 322 to $NH_3$ before the flow of diesel exhaust 320e and DEF 322 reaches the SCR unit 108. The mixed diesel exhaust 320f and DEF 322 passes through the SCR unit 308. The SCR unit 308 includes an SCR catalyst configured to facilitate reduction of NOx in the diesel exhaust with the $NH_3$. After passing through the SCR unit 308, the diesel exhaust 320g passes on to the outlet 316 of the TICA exhaust system 300.

One benefit of the embodiment of the TICA exhaust system 300 is that the overall shape of the TICA exhaust system 300 may permit use of the TICA exhaust system 300 in spaces where other EASs cannot be used. For example, the TICA exhaust system 300 is shorter than each of the TICA exhaust system 100 and the TICA exhaust system 200, thus allowing the TICA exhaust system 300 to be used in locations of vehicles that are not as long as would be required to fit the TICA exhaust system 100, the TICA exhaust system 200, or some other EAS.

Figure 8:
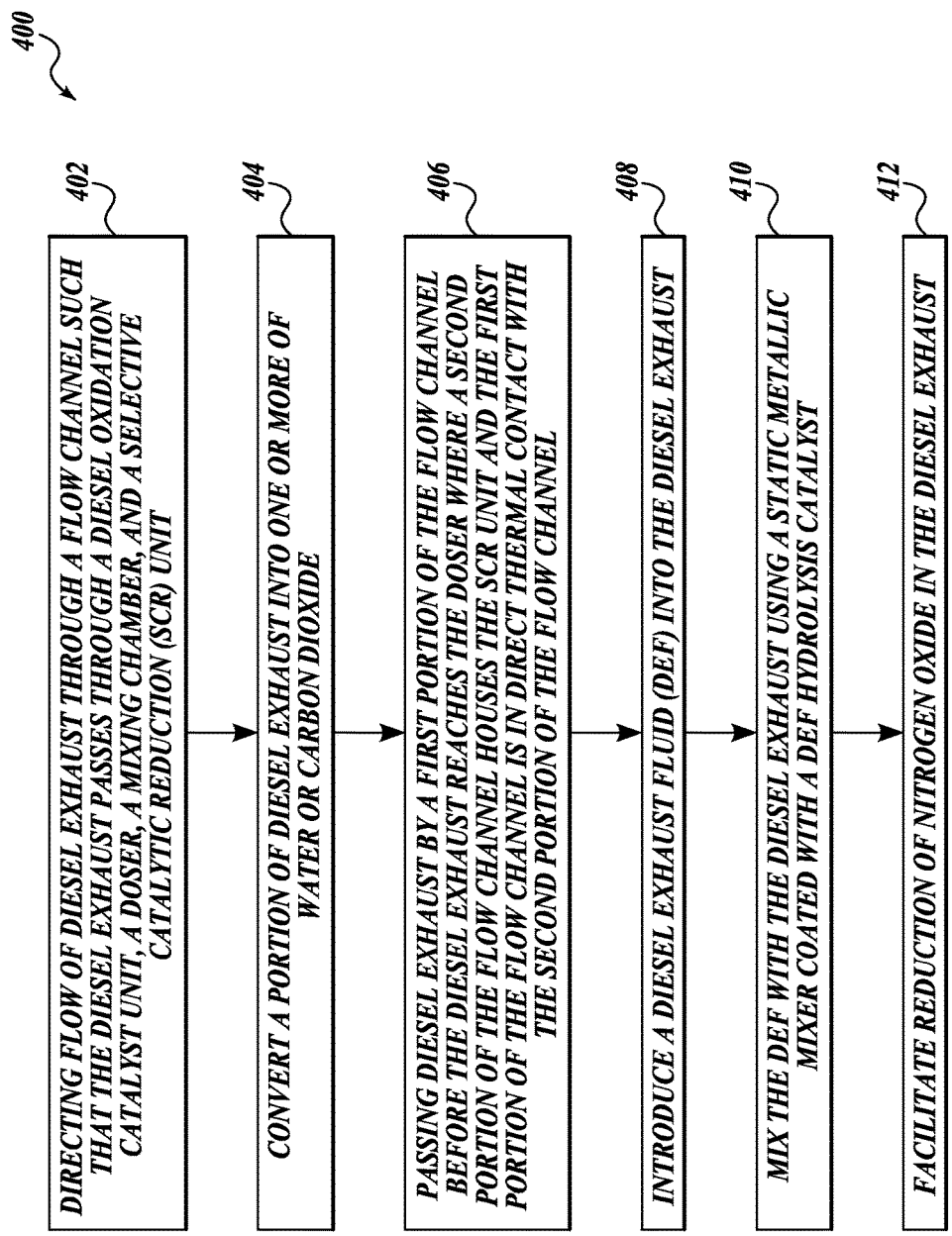
FIG. 8 depicts an embodiment of a method of treating diesel exhaust using any of the embodiments of TICA exhaust systems described herein.

Any of the embodiments of TICA exhaust systems disclosed herein are capable of being used to perform a method 400 depicted in FIG. 8. At block 402, flow of diesel exhaust is directed through a flow channel such that the diesel exhaust passes through a diesel oxidation catalyst unit, a doser, a mixing chamber, and a selective catalytic reduction (SCR) unit. At block 404, a portion of the diesel exhaust is converted by the diesel oxidation catalyst unit into one or more of water or carbon dioxide.

At block 406, the diesel exhaust is passed by a first portion of the flow channel before the diesel exhaust reaches the doser. A second portion of the flow channel houses the SCR unit and the first portion of the flow channel is in direct thermal contact with the second portion of the flow channel. In this way, heat from the diesel exhaust before the diesel exhaust reaches the doser is passed to the SCR unit. At block 408, DEF is introduced into the diesel exhaust by the doser. At block 410, the DEF is mixed with the diesel exhaust in the mixing chamber using a static metallic mixer coated with a DEF hydrolysis catalyst. In some embodiments, the DEF hydrolysis catalyst is configured to convert at least some of the DEF to $NH_3$. At block 412, reduction of NOx in the diesel exhaust is facilitated by an SCR catalyst the SCR unit using the $NH_3$ converted by the DEF hydrolysis catalyst.

The embodiments of TICA exhaust systems and attendant methods disclosed herein can provide a number of advantages over existing EAS technologies. More specifically, the TICA exhaust systems and attendant methods disclosed herein are capable of exhibiting improvements over existing EAS technologies in some or all of these areas: DEF decomposition, $NH_3$ uniformity, minimized DEF deposit formation, overall packaging (e.g., volume, weight), cost, thermal management of DEF and SCR catalyst, SC sensitivity to $NO_2$ and NOx, $NH_3$ oxidation (e.g., $NO_2$, $N_2O$), passive regeneration (affecting low temperature lightoff), and EAS back pressure (affecting fuel economy).

In one example of a potential benefit over the existing EAS technologies, the TICA exhaust systems are capable of operating efficiently at lower exhaust stream temperatures than existing EASs. This includes the ability to apply electrical heat to warm the SCR catalyst in addition to the heat being passed from undosed diesel exhaust. The SCR catalyst is capable of being coated onto a metallic impact mixer (e.g., wire mesh) mixer of an SCR unit to establish and maintain a desired operating temperature. By making the SCR catalyst the primary focus for thermal management, the TICA exhaust systems and attendant methods disclosed herein improve cold start, cold full throttle performance, and overall SCR performance.

In another example of a potential benefit over the existing EAS technologies, a size of a TICA exhaust system can be compact enough to meet a number of different design requirements. In another example, the TICA exhaust systems have limited standard variants of the resulting products of the diesel exhaust. In another example, the TICA exhaust systems are capable of using a urea hydrolysis catalyst for efficient urea decomposition. In another example, the TICA exhaust systems are capable of high efficiency mixing to produce high $NH_3$ uniformity index with diesel exhaust. In another example, a binary catalyst is capable of being used in an SCR unit and/or a combined SCR unit and DPF. In another example, highly efficient and durable SCR catalysts are capable of being used to treat diesel exhaust. In another example, the TICA exhaust systems can be provided with electro-activated DEF dosers to increase dispersion, evaporation, mixing, and/or decomposition. Any number of other benefits can be achieved using the TICA exhaust systems and attendant methods disclosed herein.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A thermally integrated catalyst aftertreatment (TICA) exhaust system, comprising:
- a diesel oxidation catalyst unit comprising a diesel oxidation catalyst configured to convert a portion of diesel exhaust into one or more of water, carbon dioxide, or nitrogen dioxide;
- a doser configured to introduce diesel exhaust fluid (DEF) into the diesel exhaust;
- a mixing chamber configured to permit mixing of the DEF with the diesel exhaust, the mixing chamber including a static metallic mixer having a DEF hydrolysis catalyst coated thereon, wherein the DEF hydrolysis catalyst is configured to convert at least some of the DEF to $NH_3$;
- a selective catalytic reduction (SCR) unit comprising an SCR catalyst configured to facilitate reduction of nitrogen oxide (NOx) in the diesel exhaust with the NH3; and
- a flow channel configured to direct flow of the diesel exhaust from the diesel oxidation catalyst unit, to the doser, to the mixing chamber, and to the SCR unit, wherein a first portion of the flow channel before the diesel exhaust reaches the doser is in direct thermal contact with a second portion of the flow channel that houses the SCR unit such that heat from the diesel exhaust before the diesel exhaust reaches the doser is passed to the SCR unit,
- wherein the first portion of the flow channel and the second portion of the flow channel are integrally formed together, and the integrally formed first and second portions of the flow channel are located around a perimeter of the SCR unit such that the flow channel is configured to direct flow of the diesel exhaust around the perimeter of the SCR unit before flow of the diesel exhaust is directed to the doser.

2. The TICA exhaust system of claim 1, wherein diesel exhaust reaches the first portion of the flow channel after passing through the diesel oxidation catalyst unit.

3. The TICA exhaust system of claim 1, wherein the SCR unit is integrated with a diesel particulate filter (DPF), wherein the integrated SCR unit and DPF are configured to filter soot and passively oxidize the diesel exhaust simultaneously with NOx reduction.

4. The TICA exhaust system of claim 1, wherein the SCR catalyst is a binary catalyst.

5. The TICA exhaust system of claim 1, further comprising:
a heating system configured to heat the static metallic mixer of the mixing chamber.

6. The TICA exhaust system of claim 1, further comprising:
a supplemental SCR catalyst unit comprising an ammonia slip catalyst (ASC), wherein the flow channel is configured to direct flow of the diesel exhaust from the SCR unit to the supplemental SCR catalyst unit, wherein the ammonia slip catalyst (ASC) is configured to oxidize ammonia to nitrogen.

7. The TICA exhaust system of claim 1, further comprising:
a supplemental SCR catalyst unit comprising an ammonia slip catalyst (ASC), wherein the flow channel is configured to direct flow of the diesel exhaust from the mixing chamber to the supplemental SCR catalyst unit and then to the SCR unit, wherein the ammonia slip catalyst (ASC) is configured to oxidize ammonia to nitrogen.

8. The TICA exhaust system of claim 1, wherein the doser is electro-activatable, wherein electro-activation of the doser causes at least one of:
reduction of droplet size of DEF introduced into the diesel exhaust;
vaporization of the DEF to increase concentration of DEF droplets introduced into the diesel exhaust;
formation of one or both of $H_2$ or $NH_3$ reductants during dosing of the diesel exhaust;
increased uniformity of mixing of the DEF with the diesel exhaust; or
increased DEF decomposition and reduced DEF deposit formation in the mixing chamber.

9. The TICA exhaust system of claim 1, wherein the mixing chamber comprises baffles configured to create a swirl flow pattern of the diesel exhaust before introduction of the DEF from the doser.

10. The TICA exhaust system of claim 9, wherein the baffles are configured such that the diesel exhaust, after being mixed with DEF, continues in the swirl flow pattern into the static metallic mixer of the mixing chamber.

11. The TICA exhaust system of claim 10, wherein at least a portion of the static metallic mixer of the mixing chamber is coated with the DEF hydrolysis catalyst, and wherein the DEF hydrolysis catalyst coated on the metallic mixer is configured to facilitate hydrolysis of the mixed DEF and diesel exhaust according to the formula:

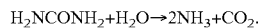

$$H_2NCONH_2 + H_2O \rightarrow 2NH_3 + CO_2.$$

12. The TICA exhaust system of claim 10, wherein the metallic mixer is configured such that electrical power supplied to the metallic mixer elevates or maintains a temperature of the DEF hydrolysis catalyst.

13. The TICA exhaust system of claim 10, further comprising:
a control unit configured to control electrical power supplied to the metallic mixer such that the temperature of the DEF hydrolysis catalyst is maintained independent of a temperature of the diesel exhaust.

14. The TICA exhaust system of claim 1, wherein the doser and the mixing chamber are configured such that the DEF is uniformly mixed in the diesel exhaust when the mixed DEF and diesel exhaust reach the SCR unit, and wherein the SCR unit is configured to filter soot and passively oxidize the diesel exhaust simultaneously with NOx reduction.

15. The TICA exhaust system of claim 1, wherein the SCR unit has a substrate with a porosity equal to or greater than about 65%, and wherein the SCR catalyst is applied as a washcoat to an internal surface area of the substrate.

16. The TICA exhaust system of claim 15, wherein the substrate comprises one or more of cordierite, silicon carbide, or aluminum titanate.

17. The TICA exhaust system of claim 1, wherein the SCR unit has a substrate with a porosity equal to or greater than about 55%, and wherein the SCR catalyst is applied as a washcoat to an internal surface area of the substrate.

18. The TICA exhaust system of claim 1, wherein the flow channel is further configured to direct flow of the diesel exhaust from the SCR unit to a tailpipe configured to expel the diesel exhaust.

19. A method of treating diesel exhaust, comprising:
providing a thermally integrated catalyst aftertreatment (TICA) exhaust system according to claim 1;
directing flow of diesel exhaust through the flow channel such that the diesel exhaust passes through the diesel oxidation catalyst unit, the doser, the mixing chamber, and the selective catalytic reduction (SCR) unit;
converting, by the diesel oxidation catalyst of the diesel oxidation catalyst unit, a portion of diesel exhaust into one or more of water or carbon dioxide;
introducing, by the doser, the diesel exhaust fluid (DEF) into the diesel exhaust;
mixing, by the static metallic mixer in the mixing chamber, the DEF with the diesel exhaust, the static metallic mixer having a DEF hydrolysis catalyst coated thereon, wherein the DEF hydrolysis catalyst is configured to convert at least some of the DEF to $NH_3$;
facilitating, by the SCR catalyst of the SCR unit, reduction of nitrogen oxide (NOx) in the diesel exhaust with the NH3;
wherein the diesel exhaust passes the first portion of the flow channel before the diesel exhaust reaches the doser, wherein the second portion of the flow channel houses the SCR unit, and wherein the first portion of the flow channel is in direct thermal contact with the second portion of the flow channel such that heat from the diesel exhaust before the diesel exhaust reaches the doser is passed to the SCR unit.

20. The method of claim 19, wherein the first portion of the flow channel and the second portion of the flow channel are integrally formed together, and wherein the integrally formed first and second portions of the flow channel are located around a perimeter of the SCR unit such that the flow channel is configured to direct flow of the diesel exhaust around the perimeter of the SCR unit before flow of the diesel exhaust is directed to the doser.

21. A thermally integrated catalyst aftertreatment (TICA) exhaust system, comprising:
- a diesel oxidation catalyst unit comprising a diesel oxidation catalyst configured to convert a portion of diesel exhaust into one or more of water, carbon dioxide, or nitrogen dioxide;
- a doser configured to introduce diesel exhaust fluid (DEF) into the diesel exhaust;
- a mixing chamber configured to permit mixing of the DEF with the diesel exhaust, the mixing chamber including a static metallic mixer having a DEF hydrolysis catalyst coated thereon, wherein the DEF hydrolysis catalyst is configured to convert at least some of the DEF to $NH_3$;
- a selective catalytic reduction (SCR) unit comprising an SCR catalyst configured to facilitate reduction of nitrogen oxide (NOx) in the diesel exhaust with the NH3; and
- a flow channel configured to direct flow of the diesel exhaust from the diesel oxidation catalyst unit, to the doser, to the mixing chamber, and to the SCR unit, wherein a first portion of the flow channel before the diesel exhaust reaches the doser is in direct thermal contact with a second portion of the flow channel that houses the SCR unit such that heat from the diesel exhaust before the diesel exhaust reaches the doser is passed to the SCR unit, wherein diesel exhaust reaches the first portion of the flow channel after passing through the diesel oxidation catalyst unit.

* * * * *